United States Patent [19]

Takase et al.

[11] Patent Number: 4,527,248
[45] Date of Patent: Jul. 2, 1985

[54] ENGINE SPEED SENSING DEVICE

[75] Inventors: Sadao Takase; Katsunori Oshiage; Akito Yamamoto; Akio Hosaka, all of Yokosuka, Japan

[73] Assignee: Nissan Motor Company, Limited, Yokohama, Japan

[21] Appl. No.: 333,742

[22] Filed: Dec. 23, 1981

[30] Foreign Application Priority Data

Dec. 26, 1980 [JP]  Japan ................. 55-184112

[51] Int. Cl.$^3$ ................ F02P 5/03; G01P 3/42
[52] U.S. Cl. .................... 364/565; 364/431.07; 364/431.04; 364/424; 324/160; 123/418
[58] Field of Search ............. 364/431.01, 431.02, 364/431.03, 431.04, 431.05, 431.06, 431.07, 424, 551, 565, 431.12, 467, 486, 569; 377/15, 19, 20; 324/160; 123/416, 417, 418, 480, 487

[56] References Cited

U.S. PATENT DOCUMENTS

| 3,500,024 | 3/1970 | Stacy et al. ............. 377/19 X |
| 3,828,325 | 8/1974 | Stafford et al. ............ 340/172.5 |
| 4,181,962 | 1/1980 | West, Jr. et al. ........... 364/565 |
| 4,276,601 | 6/1981 | Tokuda et al. ............. 364/431 |
| 4,312,043 | 1/1982 | Frank et al. .............. 364/424 X |
| 4,348,728 | 9/1982 | Sagisaka et al. ........... 364/431.05 |
| 4,356,447 | 10/1982 | Hönig et al. .............. 364/565 |

FOREIGN PATENT DOCUMENTS 54-47033  4/1979  Japan .
54-57003  5/1979  Japan .

OTHER PUBLICATIONS

Newell, Sydney B.; "Introduction to Microcomputing"; Harper & Row.
Messen and Prufer, Sep. 1970, pp. 739–743, "Elektronische Drehzahlmessung".

Primary Examiner—Errol A. Krass
Assistant Examiner—Kevin J. Teska
Attorney, Agent, or Firm—Schwartz, Jeffery, Schwaab, Mack, Blumenthal & Koch

[57] ABSTRACT

In an engine speed sensing device, angle pulses produced when the crankshaft rotates through a predetermined angle are counted by a counter for a predetermined interval. The count of angle pulses is read into a central processing unit of a digital computer at the end of each set time interval in response to a control signal which both updates the angle pulse count and signals the processing unit to read the count.

2 Claims, 2 Drawing Figures

ENGINE SPEED SENSING DEVICE

BACKGROUND OF THE INVENTION

The present invention relates to an electronic control apparatus for use with an internal combustion engine using a digital computer, and more particularly to an engine speed sensing device wherein crank angle pulses are counted by a counter for a set time interval and the crank angle pulse count is read into a central processing unit of the computer to control, for example, the respective amounts of intake air and fuel supplied, spark timing and so forth.

In a conventional electronic control apparatus, a time interval set by the central processing unit (CPU) is counted by clock pulses. Angle pulses produced by a crank sensor each time the crankshaft rotates through a predetermined angle are counted by a counter during the time interval, and are latched at the end of the time interval. Then the latched count of angle pulses is read by the CPU after a subsequent time interval also set by the CPU. In other words, the timing at which the latched count of angle pulses are read into the CPU does not coincide with the end of the corresponding set time interval. Thus, the presence of this difference between the end of each set time interval and the time the latched count of angle pulses is read ensures some imprecision in the crank angle pulse count used to determine engine speed. Thus, if the engine speed greatly changes between the end of the immediately preceding time interval and the time of reading of the latched count of angle pulses, the latest data read into the CPU will not accurately reflect actual conditions, so that precise, high-speed control of the amounts of intake air and fuel supplied and so forth cannot be ensured.

SUMMARY OF THE INVENTION

It is therefore the object of the present invention to provide an electronic engine speed sensing device in which crank angle pulses indicative of engine rotation are counted during a predetermined time interval and a signal indicating the end of the predetermined time interval is also used to generate a signal indicating that the crank angle pulse count is to be read into the electronic engine control system so that control processes in the electronic engine control system are provided with the most recent engine speed data.

An engine speed sensing device according to the present invention includes a counter which counts crank angle sensor angle pulses, which are produced each time the crankshaft rotates through a predetermined angle. Means is provided for determining a time interval during which the counter effects its counting operation and for producing a control signal when the time interval has elapsed. Also, means is provided for receiving the count value of the counter and latching the count value of the counter in response to the control signal. The control signal resets the counter and causes the counter to again start counting angle pulses from the crank angle sensor. An interrupt control unit responds to the control signal by producing an interrupt request signal to a central processing unit which executes a plurality of different programs. The interrupt request signal serves to interrupt execution of the current program and causes the central processing unit to read the count value latched in the receiving means.

BRIEF DESCRIPTION OF THE DRAWINGS

The above and other objects, features and advantages of the present invention will be apparent from the following detailed description of a preferred embodiment thereof taken in conjunction with the accompanying drawings in which.

DETAILED DESCRIPTION OF THE PREFERRED EMBODIMENT

Figure 1:
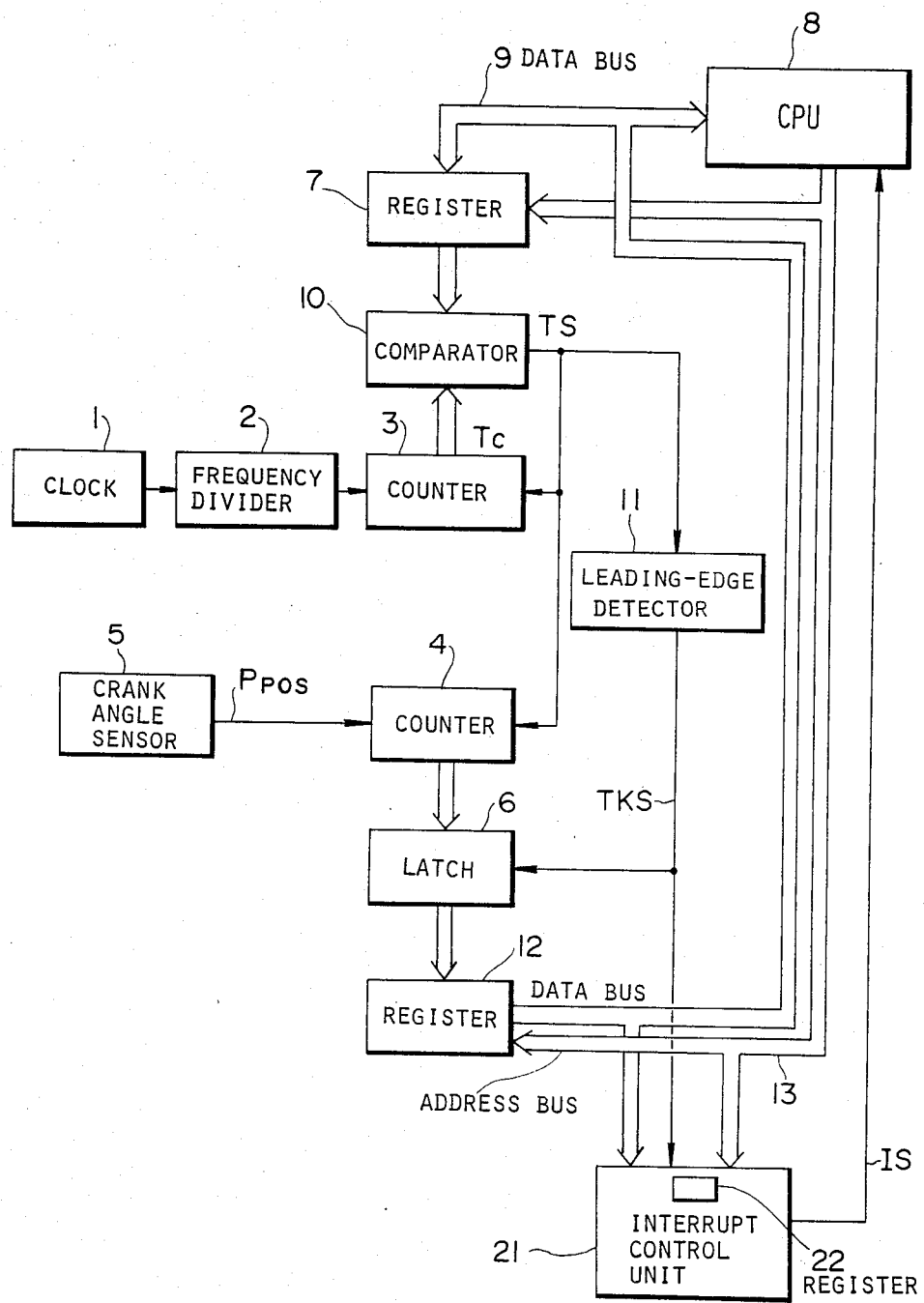
FIG. 1 is a block diagram of a preferred embodiment of an engine speed sensing device according to the present invention.

In FIG. 1 of the drawings, there is shown a preferred embodiment of an engine speed sensing device according to the present invention, constituting part of an electronic engine control system for an automotive vehicle internal combustion engine including a digital microcomputer. According to this sensing device, the engine speed or rpm is determined on the basis of angular pulses produced each time the crankshaft rotates through a predetermined angle, and is in turn used to control the respective controllable variables, such as the amount of intake air, spark timing, the amount of fuel supplied, etc.

A clock generator 1, including an oscillator and frequency dividers connected thereto, produces a clock pulse signal of a predetermined period. A frequency divider 2 receives the clock signal from the generator 1 and feeds pulses to a counter 3 in response to clock pulses, the contents of the counter being shown at $T_c$ in FIG. 2. A counter 4 counts angle pulses $P_{pos}$ outputted from a crank angle sensor 5 mounted on the crankshaft, each angle pulse being produced in response to rotation of the crankshaft through a predetermined incremental angle, and outputs its accumulated count to a latch 6.

Figure 2:
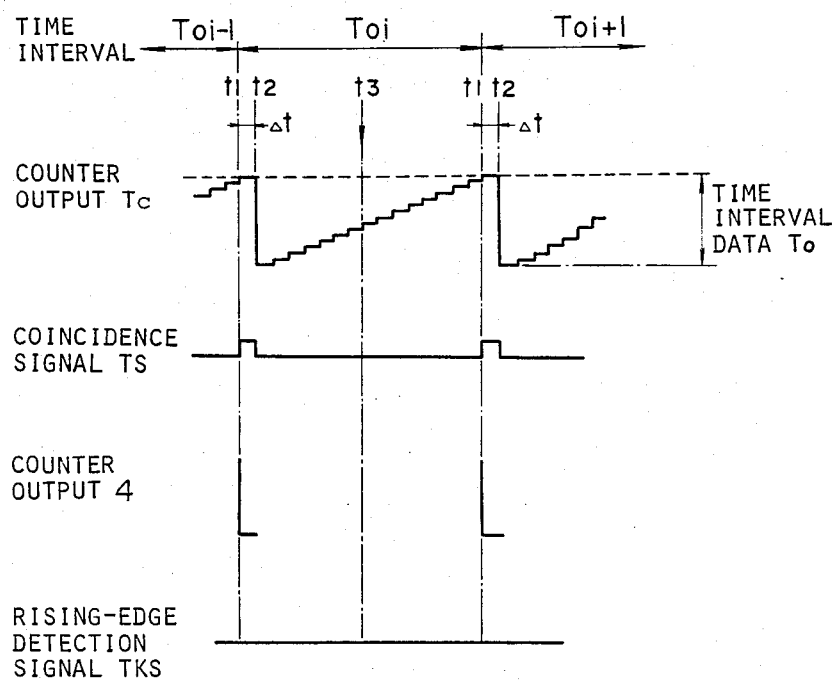
FIG. 2 is a timing chart of the device of FIG. 1.

A register 7 is loaded with a predetermined time interval value $T_o$ through a data bus 9 from a central processing unit (CPU) 8. The value $T_o$ is the desired engine speed data update period. A comparator 10 compares the time interval data $T_o$ with the clock information $T_c$ from the counter 3 and outputs a coincidence signal TS to a leading-edge detector 11 when $T_c$ is equal to, or greater than, $T_o$, as shown in FIG. 2. When the clock information $T_c$ is less than $T_o$, the comparator output is zero. When the leading-edge detector 11 detects the leading-edge of the coincidence signal TS, time $t_1$ in FIG. 2, it outputs a signal TKS to the latch 6 which responds to this signal TKS to latch therein the angle pulse count data from the counter 4. This latched data is sent to, and held by, a register 12. The coincidence signal TS from the comparator 10 is sent to the counter 3 and the counter 4 at the same time. When the counter 4 receives the coincidence signal pulse TS, the accumulated angle pulse count is cleared. The coincidence signal pulse TS lasts a time $\Delta t$ after the rising-edge of TS. At a time $t_2 = t_1 + \Delta t$, the counter 4 again starts to count angle pulses $P_{pos}$ from the sensor 5. The clock information $T_c$ in the counter 3 is cleared by the trailing-edge of the coincidence signal TS and then clock pulses from the clock generator 1 against increment the counter 3. Thus far, the structure of the preferred embodiment is not significantly different from that of the prior art.

With reference to conventional systems, reference numeral $t_3$ in FIG. 2 shows the time in a single time interval $T_{oi}$ at which the engine speed data obtained at the end of the immediately preceding time interval $T_{oi-1}$ is read from the register 12. This causes the problems described in the BACKGROUND OF THE INVENTION of the specification. In order to eliminate the problems, the device according to the present invention includes an interrupt control unit 21.

The interrupt control unit 21 responds to the incoming rising-edge detection signal TKS from the detector 11 and sends an angle pulse data interrupt request signal IS to the CPU 8. In an interrupt identification register 22 provided in the unit 21, a predetermined bit is set to "1" at the same time the interrupt request signal IS is produced to indicate the generation of the signal IS.

In the electronic internal combustion engine control system incorporating the present invention, there are a plurality of different interrupt routines for processing rotation synchronization, time synchronization, and so forth in addition to the angle pulse data interrupt routine so that the respective bits in the register 22 are each assigned to corresponding different interrupt routines so that the nature of the current interrupt can be determined by CPU reading of the bits of the register 22.

The CPU 8 receives the interrupt request signal IS, retrieves the respective states of the bits in the interrupt identification register 22 through the data bus 9, and locates the interrupt routine corresponding to the source of the current interrupt request, i.e. the respective bit which is "1".

In the particular case, since the bit "1" indicating an angle pulse interrupt is written into the register 22, the CPU 8 executes an angle pulse interrupt routine by reading the angle pulse data loaded in the register 12 through the data bus 9 and uses the angle pulse data to calculate the latest engine speed to in turn control the amounts of supply air and supply fuel, etc. After reading in the data, the CPU 8 clears the bit of the register 22 indicating the angle pulse interrupt routine. This causes the interrupt control unit 21 to cease outputting the interrupt signal IS to the CPU 8. Such operations are repeated.

Thus, the angle pulse count data in the register 12 is updated at the same time that the CPU 8 is being signaled to retrieve and use it. This coordination of engine speed sensing and control system calculation ensures accurate, high-speed control of crucial engine operating parameters, such as the amount of supply fuel, and spark timing.

While the present invention has been described and shown in terms of a preferred embodiment thereof, it would be apparent to those skilled in the art that various changes and modifications of the present invention could be made without departing from the spirit and scope of the present invention as set forth in the attached claims.

What is claimed is:

1. An engine speed sensing device for use in control of an internal combustion engine having a crankshaft, said engine speed sensing device comprising:
   a crank angle sensor for producing an angle pulse each time said crankshaft rotates through a predetermined angle;
   a counter connected to said sensor for counting angle pulses from said sensor;
   means for determining a time interval during which said counter counts the angle pulses and for producing a control signal when each time interval has elapsed;
   a leading edge detector for detecting the leading edge of the control signal and for outputting a corresponding detection signal, said detection signal occurring at substantialiy the same time as said control signal;
   means responsive to the detection signal for latching the count value of said counter;
   means for receiving the latched counter value;
   said latching means comprising a latch element connected between said counter and said receiving means, said latch element being responsive to said detection signal for latching the contents of said counter and for outputting the latched counter contents to said receiving means;
   said counter being responsive to the control signal to be cleared such that the contents of said counter are latched and then said counter is cleared almost immediately;
   an interrupt control unit responsive to the detection signal for producing an interrupt request signal, said interrupt control unit comprising a first register, said first register having a bit location which is set to a predetermined state in response to said detection signal;
   a central processing unit for executing a plurality of different programs;
   said central processing unit being responsive to the interrupt request signal for reading said first register and being responsive to said predetermined state of said bit location to read the count value latched in said receiving means.

2. An engine speed sensing device as set forth in claim 1, wherein said means for determining a time interval includes said central processing unit programmed for outputting a time signal indicative of said time interval, a second register connected to receive said time signal, a clock generator for generating clock pulses and another counter for counting said clock pulses from said clock generator, said another counter being reset by said control signal, and a comparator connected to said second register and said another counter for outputting said control signal when the outputs of said second register and said another counter are equal.

* * * * *